United States Patent [19]

Martin

[11] 4,429,771

[45] Feb. 7, 1984

[54] MECHANICAL AIR FAILURE BRAKE

[75] Inventor: Thomas E. Martin, Chesterland, Ohio

[73] Assignee: The Babcock & Wilcox Company, New Orleans, La.

[21] Appl. No.: 296,395

[22] Filed: Aug. 26, 1981

[51] Int. Cl.³ .............................................. F16D 65/24
[52] U.S. Cl. ....................................... 188/170; 74/106; 74/541
[58] Field of Search ........................ 188/31, 60, 68, 69, 188/84, 170, 82.7, 82.74, 82.77, 151 A; 70/176, 177, 178, 179, 210, 211; 74/106, 520, 533, 534, 540, 541; 251/94

[56] References Cited

U.S. PATENT DOCUMENTS

| | | | |
|---|---|---|---|
| 1,370,970 | 3/1921 | Jordan | 188/31 |
| 1,772,755 | 8/1930 | Nicholson | 188/69 |
| 2,825,426 | 3/1958 | Baxter, Jr. | 188/69 |
| 3,200,907 | 8/1965 | Hansen | 188/31 |
| 3,309,139 | 3/1967 | Turner et al. | 74/540 |
| 3,452,623 | 7/1969 | Bastian | 74/520 |
| 3,661,352 | 5/1972 | McFarlane | 74/533 |
| 3,972,392 | 8/1976 | Johnson | 188/170 |
| 4,157,745 | 6/1979 | Nelson | 188/31 |
| 4,174,025 | 11/1979 | Ivachev | 188/170 |

FOREIGN PATENT DOCUMENTS

| | | | |
|---|---|---|---|
| 708376 | 7/1941 | Fed. Rep. of Germany | 74/520 |
| 930726 | 7/1955 | Fed. Rep. of Germany | 74/540 |
| 1013470 | 8/1957 | Fed. Rep. of Germany | 74/533 |
| 586725 | 4/1925 | France | 74/541 |

OTHER PUBLICATIONS

*Product Engineering*-1953 Annual Handbook, Nov. 1952, pp. F26–F27.

*Primary Examiner*—Douglas C. Butler
*Assistant Examiner*—R. R. Diefendorf
*Attorney, Agent, or Firm*—Vytas R. Matas; Robert J. Edwards

[57] ABSTRACT

A brake mechanism (10) operable to maintain an air operable control drive mechanism (12) in position in the event of failure of the air supply is disclosed. A first rack section (22) is attached to a control lever (16) of the control drive mechanism (12) and is engagable in any operable position of the control lever (16) by a second arcuate rack section (24). A compression spring (62) acting on a toggle mechanism (28) biases the racks into engagement, and an air cylinder assembly (26) acting on the toggle mechanism (28) against the compression spring (62) maintains the second rack section (24) out of engagement with the first rack section (22) so long as the air supply to the air cylinder assembly (26) is maintained.

8 Claims, 2 Drawing Figures

MECHANICAL AIR FAILURE BRAKE

TECHNICAL FIELD

The present invention relates generally to brake mechanisms, and more particularly to a positive acting air failure brake for an air operable control drive mechanism.

BACKGROUND ART

Air operable control drives are equipped with air failure brakes which are intended to hold the drive in position in the event of failure of the air supply. Prior art mechanical friction brakes, such as drum or disc brakes, require high forces to actuate and hold the drive in position. This requires a large air cylinder to create sufficient force when working with relatively low air pressure, e.g., 100 psi, which is normally used in such devices.

Because of the need for high actuating forces and a large cylinder required thereby, it has become desirable to develop a brake which includes some form of mechanical advantage which can reduce the actuating force required, and which includes some form of positive engagement so that friction force alone is not relied on to hold the control in position.

SUMMARY OF THE INVENTION

The present invention solves the aforementioned problems associated with the prior art as well as other problems by providing a rack attached to a control drive lever which is engaged by a second rack which is grounded to a fixed frame and which is spring loaded into engagement by means of a toggle mechanism. More specifically, a short rack section is attached to the end of the control drive lever, and a longer rack section is pivotally attached at the other end to an actuating mechanism which is operable to move the longer rack section into engagement with the shorter rack section. The length of the longer rack section is selected to allow the longer section to engage the shorter section in any operable position of the drive lever.

DESCRIPTION OF THE PREFERRED EMBODIMENT

Figure 1:
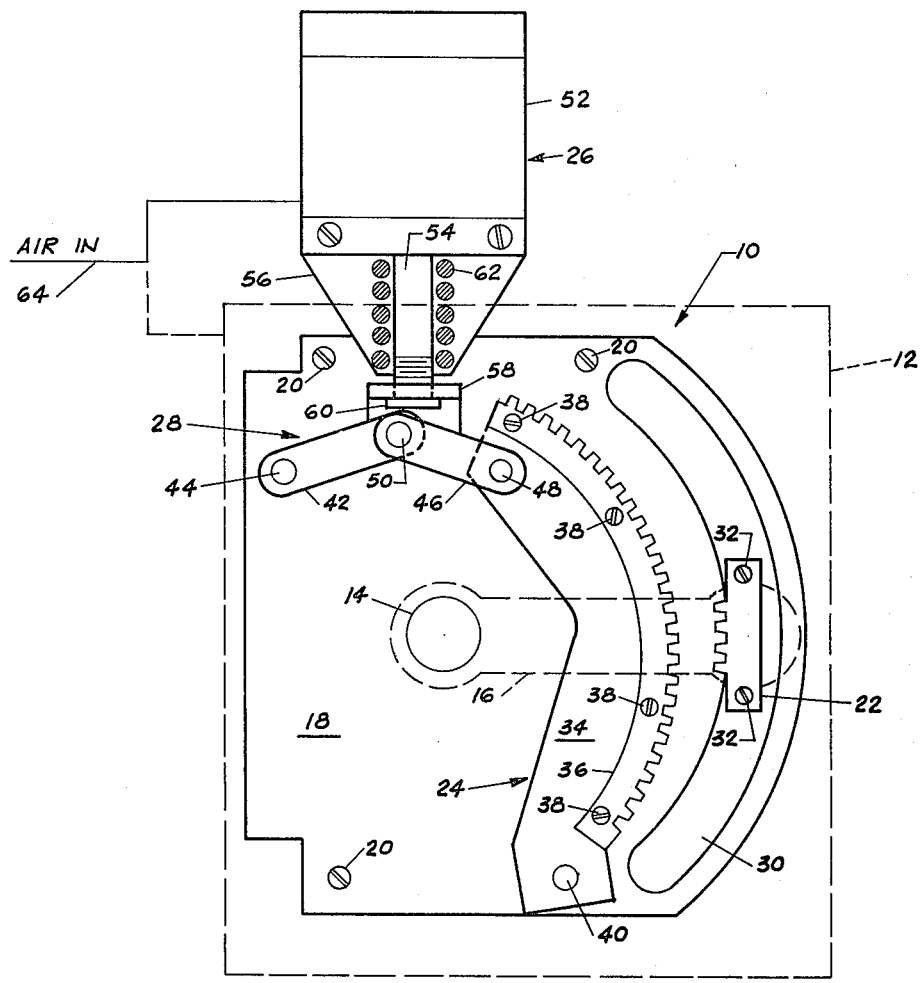
FIG. 1 is a front elevation view of the invention shown in an unlocked condition.

Referring now to the drawings where the illustrations are for the purpose of describing the preferred embodiment of the present invention and are not intended to limit the invention hereto, FIG. 1 illustrates a brake mechanism 10 adapted for use with and attached to a control drive mechanism 12 which can be a valve positioner or the like. The control drive mechanism 12 forms no part of the present invention and will not be described in detail herein. The present invention is intended for use in an air operable control system wherein it is important that certain control elements of the system remain in a fixed position in the event of failure of the air supply. In the illustrated embodiment, the control drive mechanism 12 includes an actuating shaft 14 movable to position a control element (not shown) of the system, and a drive lever 16 attached to the actuating shaft 14 for rotating the shaft through a predetermined angle of rotation. In the embodiment shown, the actuating shaft 14 rotates 90 degrees and must be capable of being locked at any point in its movement in the event of failure of the air supply to the system.

The brake mechanism 10 comprises a mounting plate or frame 18 attached to the control drive mechanism 12 by means of screws 20 or the like, a short rack section 22 attached to the end of the drive lever 16, an elongated, arcuate long rack section 24 pivotally mounted on the frame 18, an actuating cylinder assembly 26, and a toggle assembly 28 acting between the frame 18 and the long rack section 24 and movable by the actuating cylinder assembly 26 to move the long rack section 24 into and out of engagement with the short rack section 22.

In the illustrated embodiment of the invention, frame 18 is attached to the control drive mechanism 12 with the drive lever 16 received beneath the frame, as shown by the broken lines. An arcuate slot 30 is formed in the frame 18 in a position to coincide with the outer end of the drive lever 16. The short rack section 22 is received outside the frame 18 and is attached to the drive lever 16 by means of screws 32 extending through the slot 30.

The long rack section 24 illustrated herein comprises a plate 34 and a separate toothed section 36 attached to the plate 34 by means of screws 38. The plate 34 is pivotally mounted at 40 to the frame 18 for movement between the position shown in FIG. 1 wherein the long rack section 24 is out of engagement with the short rack section 22, and the position shown in FIG. 2 wherein the long rack section 24 is engaged with the short rack section 22.

The toggle assembly 28 comprises a first link 42 pivotally mounted at one end to the frame 18 at 44, and a second link 46 pivotally mounted at one end to the plate 34 at 48 and at the other end to the first link 42 at 50.

The actuating cylinder assembly 26 comprises a cylinder body 52, a piston rod 54 extensible therefrom and a piston (not shown) attached to the piston rod. The actuating cylinder utilizes a single air supply port and a spring return mechanism as will be hereinafter described. The cylinder body 52 can be separately fixed, or it can be attached to the frame 18 by means of a mounting bracket 56. The free end of the piston rod 54 is threaded and is received in one leg of an L-shaped adapter 58 and locked in position by means of a lock nut 60. The other leg of the L-shaped adapter 58 is pivotally attached to the links 42 and 46 at 50. The piston rod 54 is normally maintained in an extended position, as illustrated in FIG. 2, by means of a compression spring 62 received between the cylinder body 52 and the L-shaped adapter 58, and is moved to the retracted position, illustrated in FIG. 1, by means of air presure applied, through line 64, against the actuating cylinder piston causing axial movement, in the upward direction, of the piston and the piston rod 54 within the cylinder body 52.

Under normal operating conditions, air having sufficient pressure to overcome the force of the compression spring 62 is applied against the actuating cylinder piston so as to maintain the toggle assembly 28 in the retracted or unlocked position of FIG. 1 which, in turn, maintains the long rack section 24 disengaged from the short rack section 22. In this condition the drive lever 16 is free to move to any desired position within its operating range.

Figure 2:
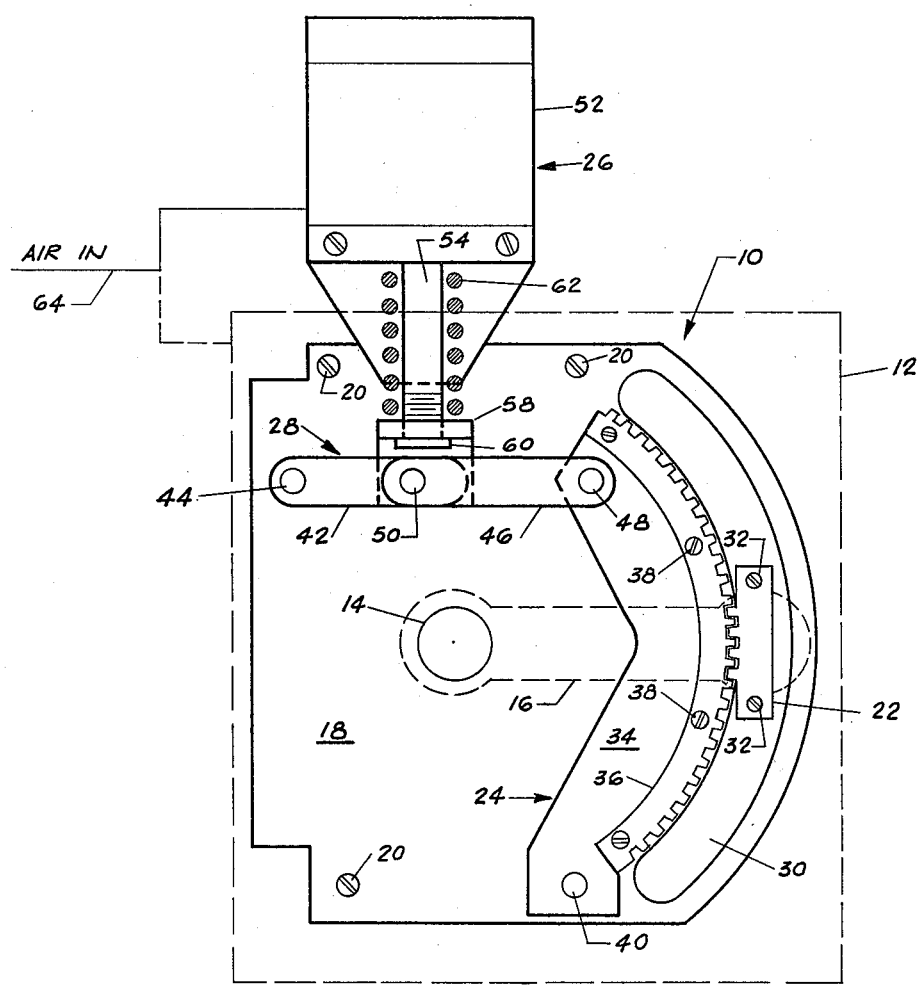
FIG. 2 is a view similar to FIG. 1, but showing the invention in a locked position.

In the event of failure of the air supply, the loss of air pressure against the piston causes the compression spring 62 to automatically drive the piston rod 54 and the L-shaped adapter 58 in a downward direction as shown in FIG. 2, moving the toggle assembly 28 to a locked position and pivoting the long rack section 24 clockwise about point 40 and engaging it with the short rack section 22 in whatever position the short rack section is in to lock the drive lever 16 in that position until the air supply can be restored. With the toggle assembly 28 in its locked position, the long rack section 24 becomes locked into engagement with the short rack section 22 and cannot be moved out of engagement by a force applied to the drive lever 16. In this condition only a retracting force applied to the piston rod 54 by restoration of the air supply will return the toggle assembly 28 to the unlocked position of FIG. 1 and disengage the long rack section 24 from the short rack section 22. Since only a relatively small force applied to the center of the toggle assembly 28 is required to lock and unlock it, and since the rack sections 24 and 22 engage positively, the actuating cylinder assembly 26 and the compression spring 62 can be relatively small as compared with those required for a direct acting friction brake mechanism.

Certain modifications and improvements will occur to those skilled in the art upon reading the foregoing. It should be understood that all such modifications and improvements have been deleted herein for the sake of conciseness and readability but are properly within the scope of the following claims.

I claim:

1. In a control drive mechanism comprising a control shaft movable through a predetermined angle of rotation, and a lever attached to and rotatable with said shaft, a brake mechanism comprising a first rack section mounted on said lever, a second rack section mounted for rotation on a fixed pivot and movable between a first position out of engagement with said first rack section and a second position engaged with said first rack section, means biasing said second rack section into said second position, and air motor means connected to said second rack section and operable to move said second rack section to said first position against said biasing means.

2. The apparatus as defined in claim 1 wherein said second rack section defines an arc at least coextensive with said predetermined angle of rotation, whereby said second rack section is engagable with first rack section in any operable position of said control shaft.

3. The apparatus as defind in claim 2 including a toggle mechanism connected to said second rack section and wherein said biasing means and said air motor means act on said toggle mechanism, said toggle mechanism assuming a locked position when said second rack section is in said second position.

4. The apparatus as defined in claim 3 wherein said air motor means comprises an air cylinder having a piston rod attached to said toggle mechansim, and said biasing means comprises a compression spring received between said air cylinder and said toggle mechanism and in surrounding relation to said piston rod.

5. In a control drive mechanism comprising a control shaft movable through a predetermined angle of rotation and lever attached to and rotatable with said shaft, a brake mechanism comprising a first rack section mounted on said lever, a frame member attached to said control drive mechanism, a second arcuate rack section pivotally mounted at one end to said frame member for movement between a first position out of engagement with said first rack section and a second position engaged with said first rack section, a toggle mechanism connected between said frame member and said second rack section and movable between a first unlocked position wherein said second rack section is in said first position and a second locked position wherein said second rack section is in said second position, spring means acting on said toggle mechanism to normally bias said toggle mechanism into said second position, and air motor means acting on said toggle mechanism to move said toggle mechanism to said first position against the force of said spring when air pressure is applied to said air motor means.

6. The apparatus as defined in claim 5 wherein said toggle mechanism comprises a first link pivotally attached at one end to said frame member; a second link pivotally attached at one end to said second rack section; means pivotally connecting the outer end of said first and second links together; said locked position of said toggle mechanism being defined when said means pivotally connecting said first and second links together, said pivoted connection of said first link to said frame member and the pivoted connection of said second link to said second rack section are aligned.

7. The apparatus as defined in claim 6 wherein said air motor means comprises an air cylinder mounted in a fixed position relative to said frame member and having a piston rod connected to said means pivotally connecting said first and second links together, retraction of said piston rod moving said toggle mechanism to its unlocked position.

8. The apparatus as defined in claim 7 wherein said spring means comprises a compression spring received between said air cylinder and said means pivotally connecting said first and second links together and in surrounding relation to said piston rod.

* * * * *